US010092831B2

(12) United States Patent
Erikawa

(10) Patent No.: US 10,092,831 B2
(45) Date of Patent: Oct. 9, 2018

(54) GAME SYSTEM, GAME DEVICE AND DATA PROCESSING APPARATUS

(71) Applicant: KOEI TECMO GAMES CO., LTD., Kanagawa (JP)

(72) Inventor: Keiko Erikawa, Kanagawa (JP)

(73) Assignee: KOEI TECMO GAMES CO., LTD., Kanagawa (JP)

( * ) Notice: Subject to any disclaimer, the term of this patent is extended or adjusted under 35 U.S.C. 154(b) by 45 days.

(21) Appl. No.: 15/434,577

(22) Filed: Feb. 16, 2017

(65) Prior Publication Data

US 2017/0239561 A1 Aug. 24, 2017

Related U.S. Application Data

(60) Provisional application No. 62/297,302, filed on Feb. 19, 2016.

(30) Foreign Application Priority Data

Aug. 25, 2016 (JP) .................................. 2016-164774

(51) Int. Cl.
*G06F 17/00* (2006.01)
*A63F 13/25* (2014.01)
(Continued)

(52) U.S. Cl.
CPC ............ *A63F 13/25* (2014.09); *A63F 13/215* (2014.09); *A63F 13/2145* (2014.09);
(Continued)

(58) Field of Classification Search
None
See application file for complete search history.

(56) References Cited

U.S. PATENT DOCUMENTS 8,287,385 B2 * 10/2012 Kobayashi .............. A63F 13/10
463/31
8,333,660 B2 * 12/2012 Uno ........................ A63F 13/10
273/108.31
(Continued)

FOREIGN PATENT DOCUMENTS

JP 2001-060131 3/2001
JP 2006-155565 6/2006
(Continued)

OTHER PUBLICATIONS

"PocketStation" (released exclusively in Japan on Jan. 23, 1999), From Wikipedia, the free encyclopedia with English consice explanation.

*Primary Examiner* — Ronald Laneau
(74) *Attorney, Agent, or Firm* — IPUSA, PLLC

(57) ABSTRACT

A game system includes a game device at least including a control unit, a storage unit, an output unit, an input unit and a send unit; a display device, integrally formed with the game device or separately formed from the game device, at least including an input unit connected to the game device and a display unit; and a data processing apparatus at least including a control unit, a storage unit, an output unit and a receive unit, wherein the control unit of the game device causes a game to progress by executing a game program, and controls the send unit to send a signal to the data processing apparatus when a predetermined condition is satisfied in accordance with a progression status of the game, and wherein in the data processing apparatus, when the receive unit receives the signal, the control unit performs a predetermined process based on the signal.

26 Claims, 14 Drawing Sheets

(51) Int. Cl.
*A63F 13/35* (2014.01)
*A63F 13/2145* (2014.01)
*A63F 13/215* (2014.01)
*A63F 13/28* (2014.01)
*A63F 13/5375* (2014.01)

(52) U.S. Cl.
CPC .............. *A63F 13/28* (2014.09); *A63F 13/35* (2014.09); *A63F 13/5375* (2014.09); *A63F 2300/1075* (2013.01); *A63F 2300/1081* (2013.01); *A63F 2300/206* (2013.01); *A63F 2300/302* (2013.01)

(56) References Cited

U.S. PATENT DOCUMENTS

| | | | |
|---|---|---|---|
| 2015/0038238 A1 | 2/2015 | Momose et al. | |
| 2015/0317100 A1 | 11/2015 | Shimohata et al. | |
| 2016/0086430 A1* | 3/2016 | Kitamura | G07F 17/3244 |
| | | | 463/21 |

FOREIGN PATENT DOCUMENTS

| | | |
|---|---|---|
| JP | 2007-004433 | 1/2007 |
| JP | 2007-293717 | 11/2007 |
| JP | 2014-110034 | 6/2014 |
| JP | 2014-211879 | 11/2014 |
| JP | 2015-032020 | 2/2015 |
| JP | 2015-223501 | 12/2015 |
| JP | 2016-006625 | 1/2016 |

* cited by examiner

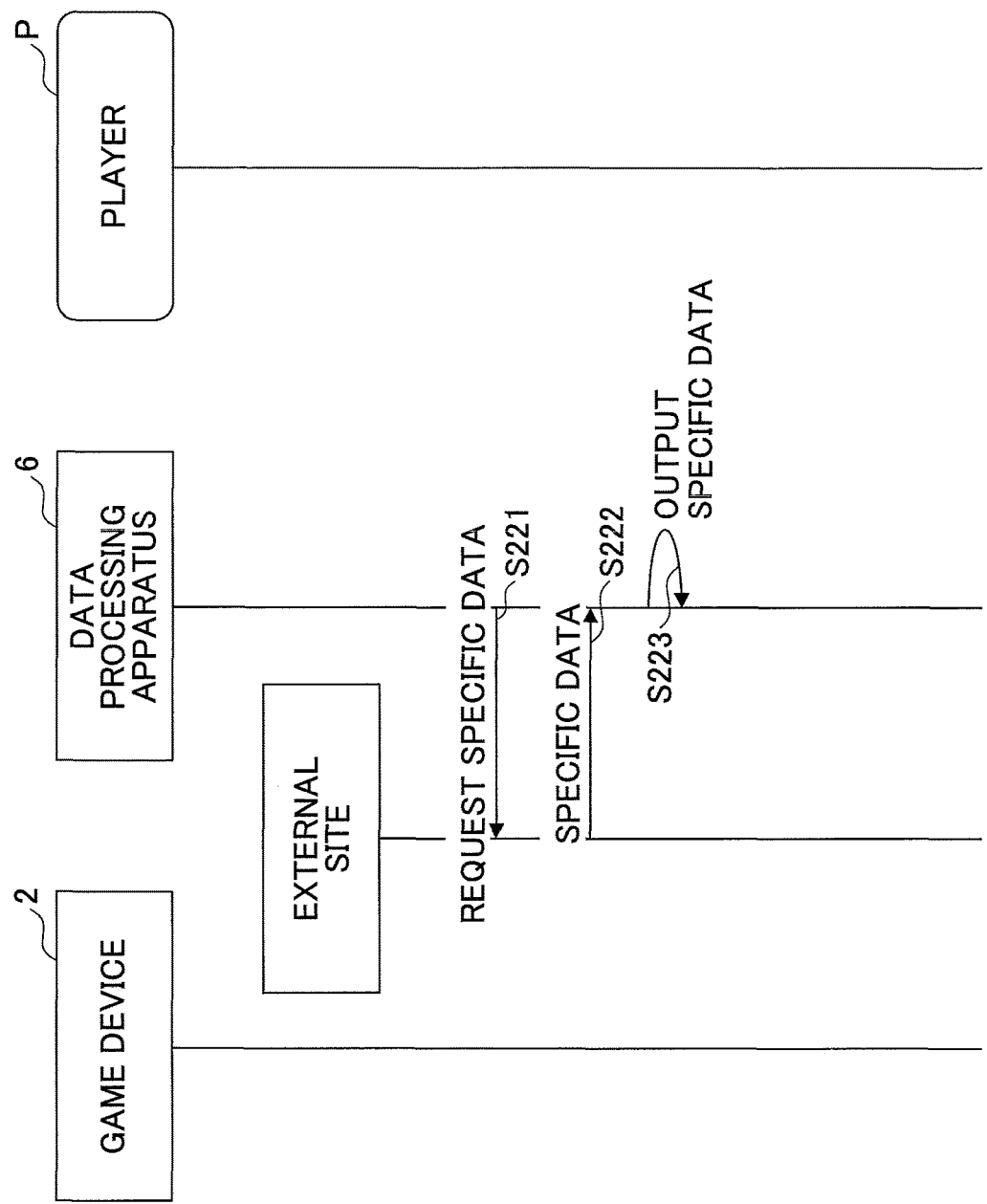

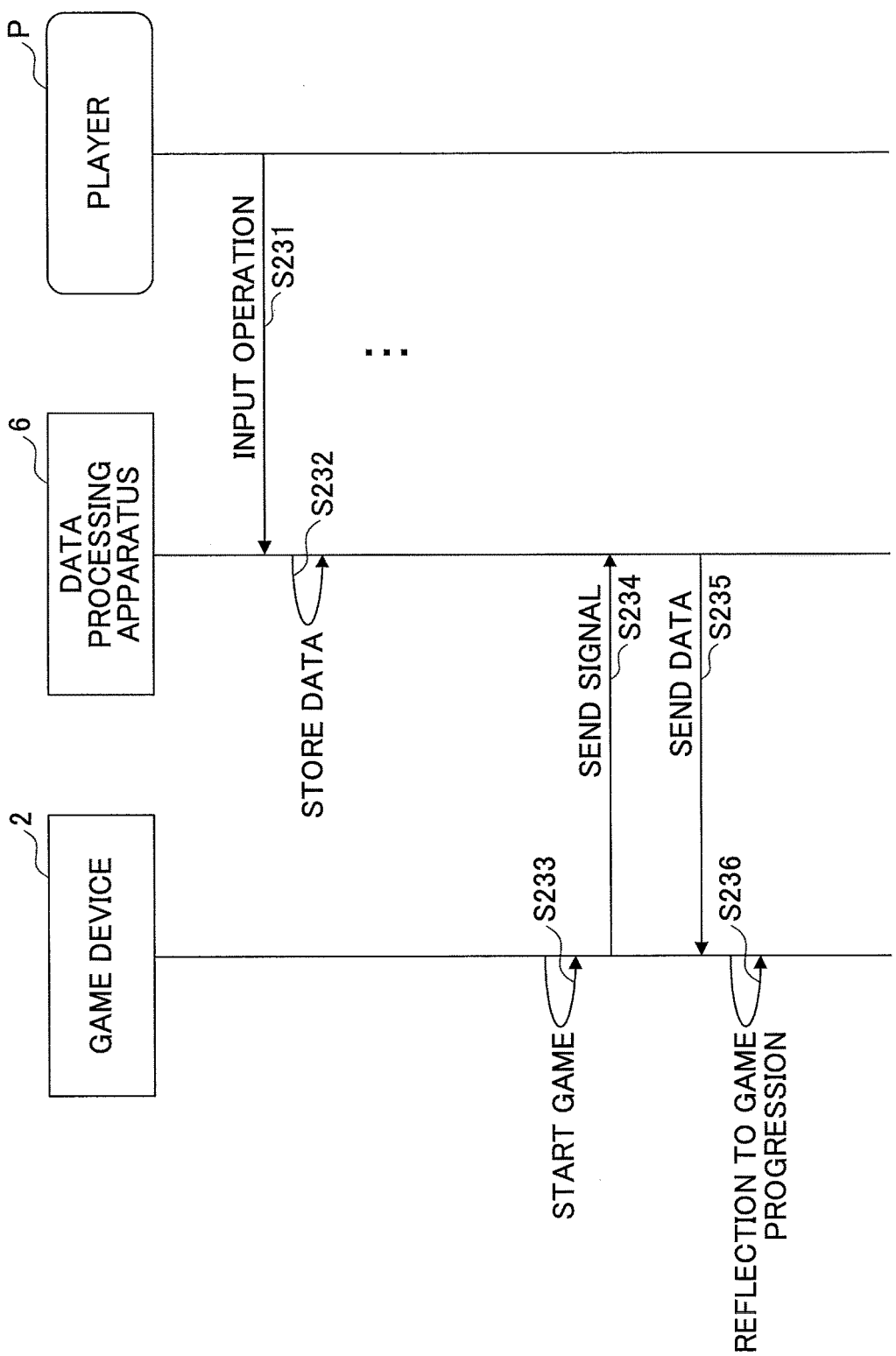

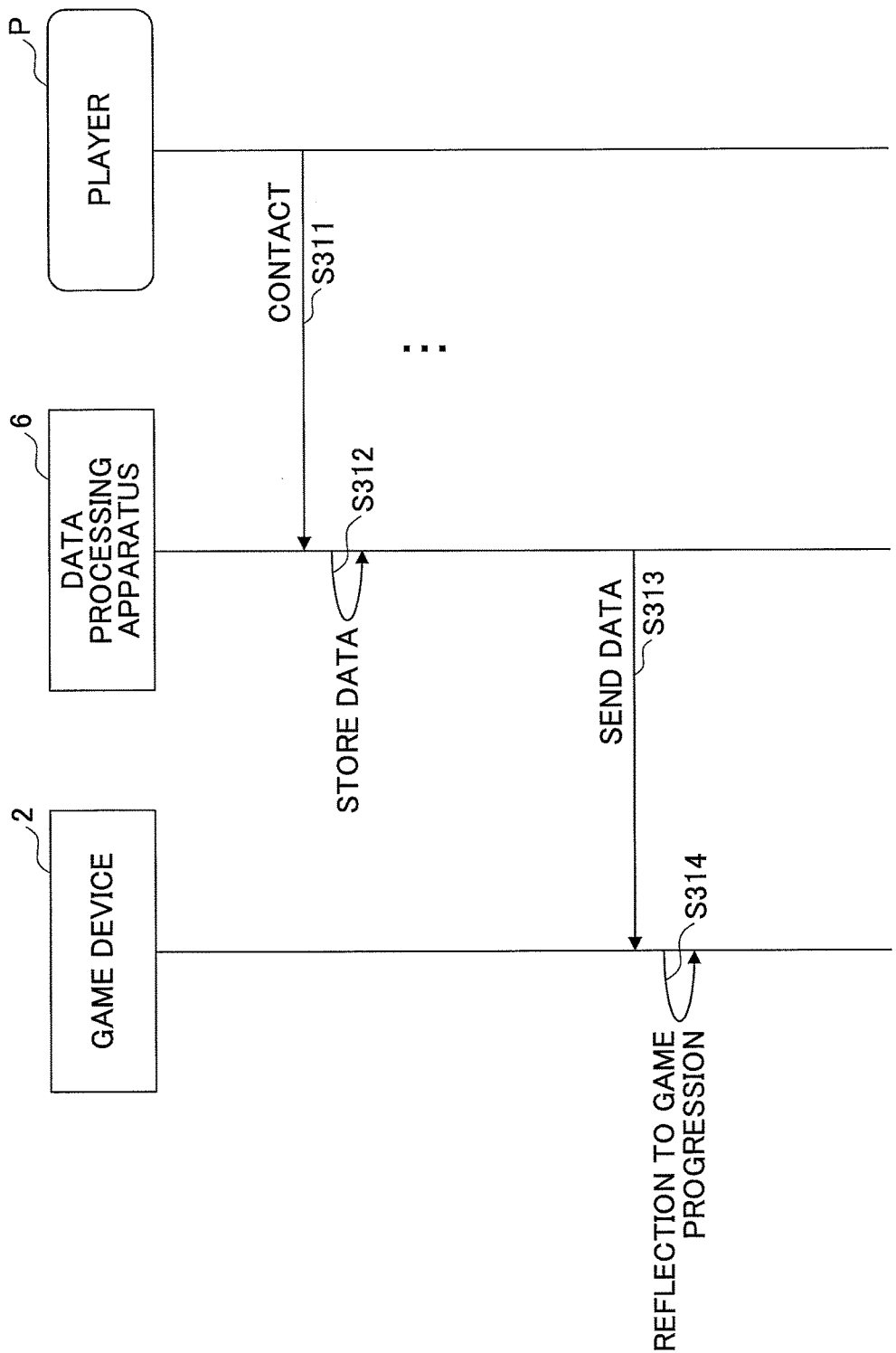

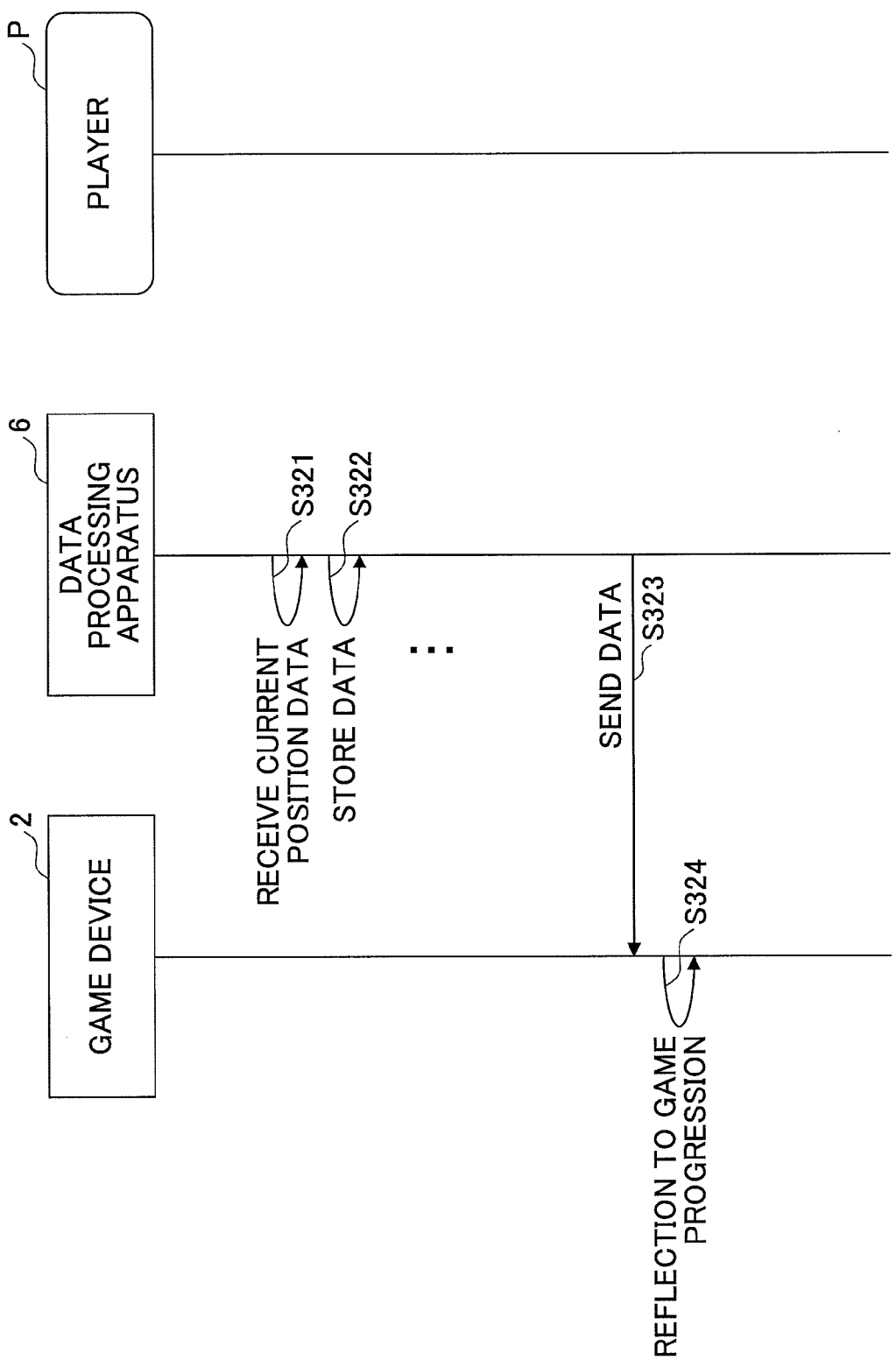

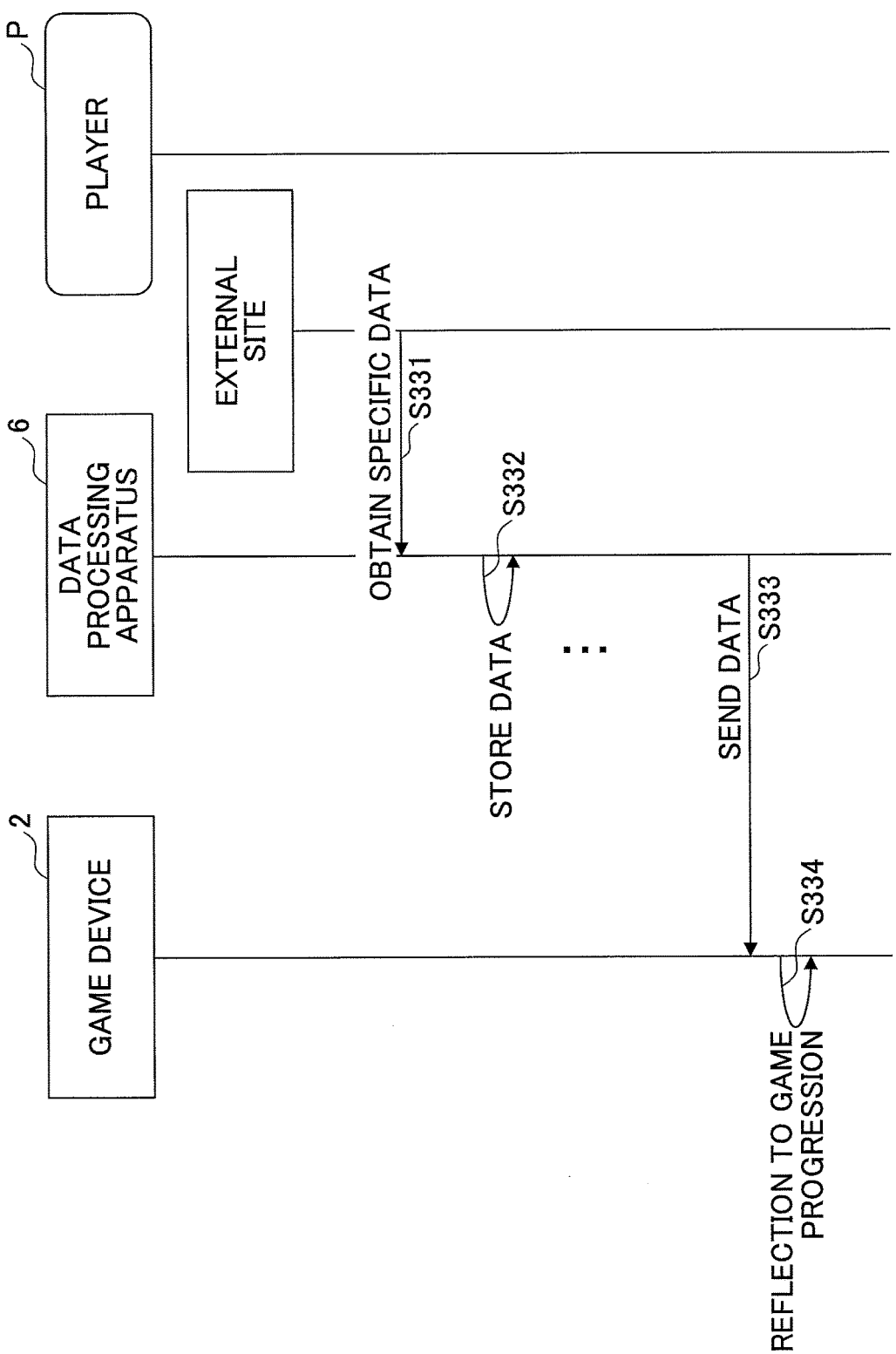

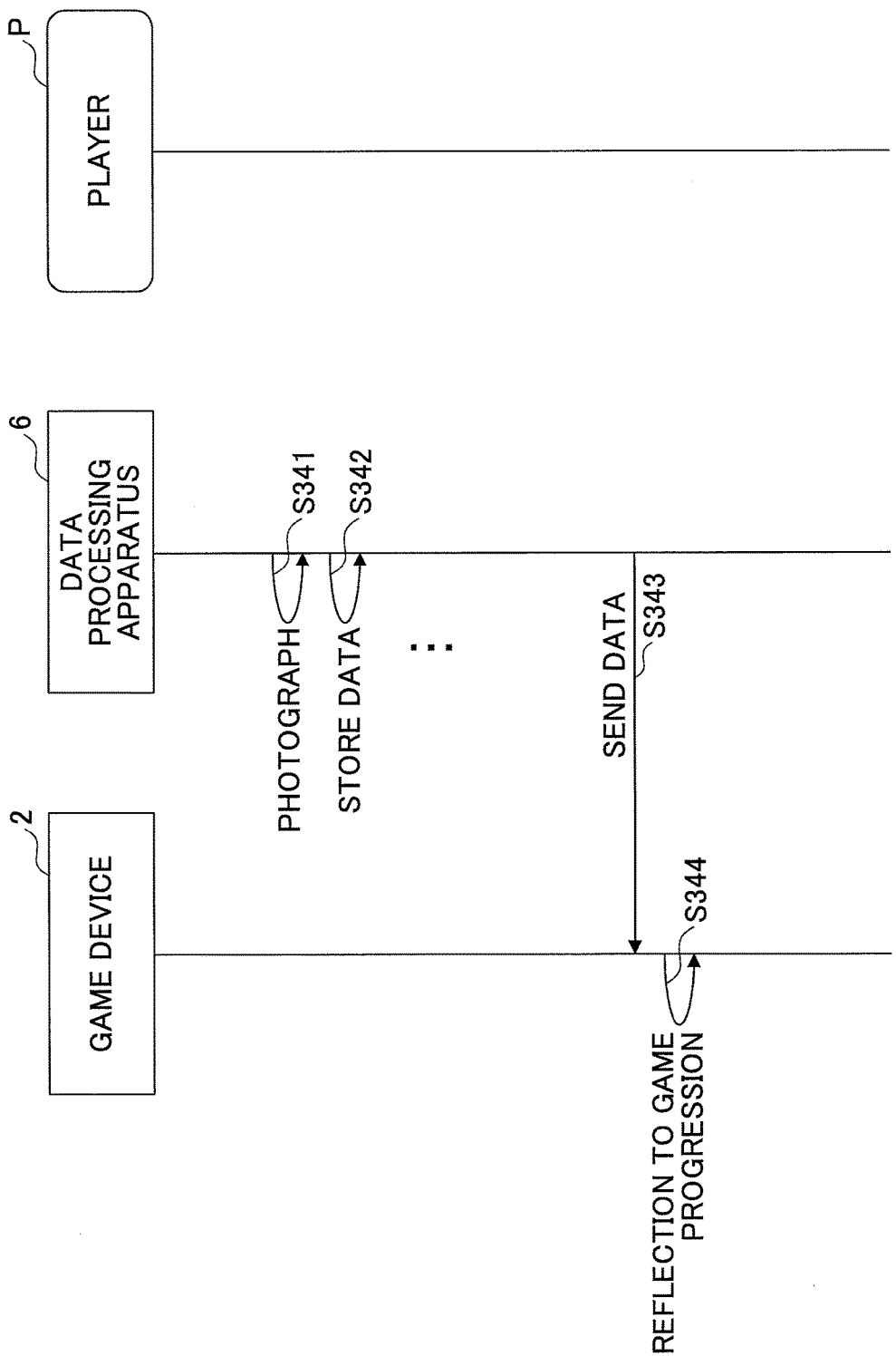

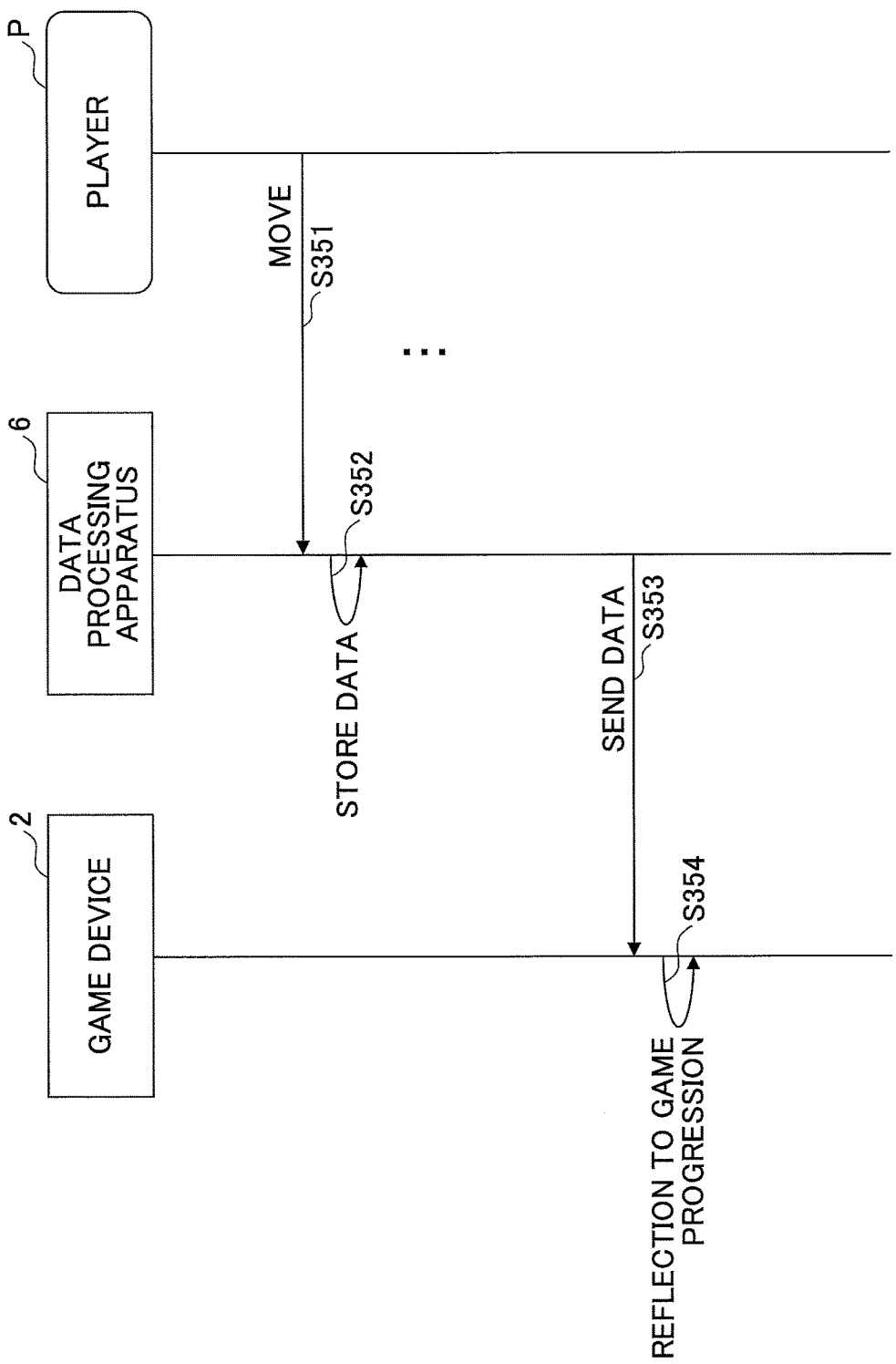

GAME SYSTEM, GAME DEVICE AND DATA PROCESSING APPARATUS

CROSS-REFERENCE TO RELATED APPLICATION

The present application is based on and claims the benefit of priority of Provisional Patent Application No. 62/297,302 filed on Feb. 19, 2016, and Japanese Priority Application No. 2016-164774 filed on Aug. 25, 2016, the entire contents of which are hereby incorporated by reference.

BACKGROUND OF THE INVENTION

1. Field of the Invention

The present invention relates to a game system, a game device and a data processing apparatus.

2. Description of the Related Art

In a general conventional game (video game), a game world is constructed by displaying video on a screen, and outputting a voice that matches the video from a speaker or a headphone. There is a case that a friend character, that is automatically controlled, appears in a game, or another player can join the game via a network for enabling players to communicate with each other, so that the player does not feel loneliness or solitude. However, such situations are actualized only via the video on the screen and the voice.

Meanwhile, techniques to have a data recording medium included in a figure of a character and a game device to cooperate with each other (see Patent Documents 1 to 3 or the like), or a technique to have a portable game device and a main game device to cooperate with each other (see Non-Patent Document 1 or the like) are known.

However, in the conventional games, as described above, a game world can be only constructed by displaying video on a screen and outputting a voice that matches the video on the screen. Thus, there is a limitation in increasing immersion in the game or entertainment of the game for a player.

Further, in the conventional techniques to have the data recording medium or the portable game device cooperate with the game device, only a character is added, or a mini-game is performed, and the immersion in the game or the entertainment of the game is not increased for the player.

PATENT DOCUMENTS

[Patent Document 1] Japanese Laid-open Patent Publication No. 2016-006625
[Patent Document 2] Japanese Laid-open Patent Publication No. 2015-032020
[Patent Document 3] Japanese Laid-open Patent Publication No. 2015-223501

Non-Patent Document

[Non-Patent Document 1] "PocketStation" (released exclusively in Japan on Jan. 23, 1999), From Wikipedia, the free encyclopedia

SUMMARY OF THE INVENTION

The present invention is made in light of the above problems, and provides a technique to improve immersion in a game or entertainment of the game for a player by using a data processing apparatus separately provided from a game device.

According to an embodiment, there is provided a game system including a game device at least including a control unit, a storage unit, an output unit, an input unit and a send unit; a display device, integrally formed with the game device or separately formed from the game device, at least including an input unit connected to the game device and a display unit; and a data processing apparatus at least including a control unit, a storage unit, an output unit and a receive unit, wherein the control unit of the game device causes a game to progress by executing a game program, and controls the send unit to send a signal to the data processing apparatus when a predetermined condition is satisfied in accordance with a progression status of the game, and wherein in the data processing apparatus, when the receive unit receives the signal, the control unit performs a predetermined process based on the signal.

BRIEF DESCRIPTION OF THE DRAWINGS

Other objects, features and advantages of the present invention will become more apparent from the following detailed description when read in conjunction with the accompanying drawings.

FIG. 8 is a sequence diagram (No. 5) illustrating an example of a process of the embodiment;
FIG. 9 is a sequence diagram (No. 6) illustrating an example of a process of the embodiment;
FIG. 10 is a sequence diagram (No. 7) illustrating an example of a process of the embodiment;
FIG. 11 is a sequence diagram (No. 8) illustrating an example of a process of the embodiment;
FIG. 12 is a sequence diagram (No. 9) illustrating an example of a process of the embodiment;
FIG. 13 is a sequence diagram (No. 10) illustrating an example of a process of the embodiment;
and
FIG. 14 is a sequence diagram (No. 11) illustrating an example of a process of the embodiment.

DETAILED DESCRIPTION OF THE PREFERRED EMBODIMENTS

The invention will be described herein with reference to illustrative embodiments. Those skilled in the art will recognize that many alternative embodiments can be accomplished using the teachings of the present invention and that the invention is not limited to the embodiments illustrated for explanatory purposes.

Figure 1:
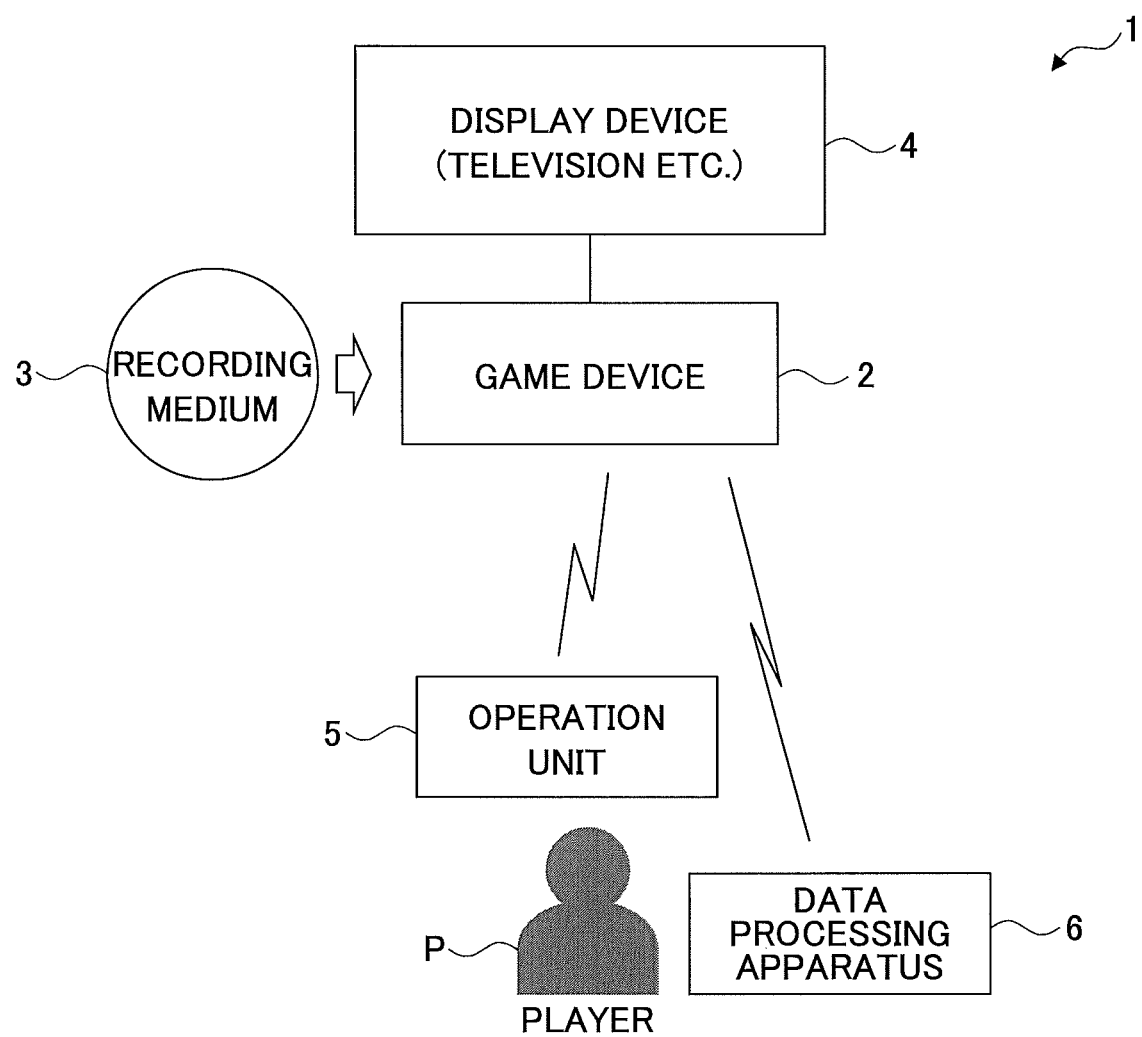
FIG. 1 is a view illustrating an example of a structure of a game system of an embodiment.

It is to be noted that, in the explanation of the drawings, the same components are given the same reference numerals, and explanations are not repeated.
(System Structure)
FIG. 1 is a view illustrating an example of a structure of a game system 1 of an embodiment. In FIG. 1, a game device 2 is connected to a display device 4 such as a television or the like. The game device 2 performs a game based on a game program stored therein or a game program stored in a recording medium 3. The game device 2 is not limited to a home game device and may be a business game device. Further, operation data is sent from an operation unit 5 operated by a player P to the game device 2 via a wireless or wired network, and progression of the game is controlled by the operation data. The operation unit 5 is a game controller, a keyboard, a mouse, a touch panel or the like, for example, and may include a display unit or a speaker. A data processing apparatus 6 placed in the vicinity of the player P appropriately communicates with the game device 2, and performs a predetermined process such as providing information to the player P or the like.

The data processing apparatus 6 is a game related product (item) that symbolizes worldview, a character or the like of the game such as a character that appears in the game. The player P places the data processing apparatus 6 around him/her, or the player P wears the data processing apparatus 6. Then, the game related product generates an action such as outputting something or the like in cooperation with the game program. With this configuration, augmented reality in the game world can be increased, the immersion in the game is further increased, and the entertainment of the game can be increased.

More specifically, the data processing apparatus 6 may be an article such as a clock such as a wall clock, a bracket clock or a watch, an accessory such as earrings, a pendant, a ring or a necklace, clothes such as a shirt, a skirt or trousers, a clothing ornament such as a hat or a belt, a mirror, a stationery, a tableware, a furniture, an electric home appliance that also has a normal function not related to the game, a product for a computer such as a mouse, a keyboard or a mouse pad, a book, a light equipment such as a ramp or a light, or a container such as a jewelry box, a housing or a bin. For such an article, a title or a logo of the game, a name of a character that appears in the game, a brand name, a place name (regardless of real or unreal) or the like may be attached in order to indicate that the article relates to a specific game. Further, other than the above described articles, the data processing apparatus 6 may be an article such as a figure, a doll, a stuffed toy, a cushion or a pillow that has an appearance of a character that appears in the game, or to which the appearance of the character that appears in the game is attached. Further, the data processing apparatus 6 may be an article such as a model, a toy or a key chain that has an appearance of an inanimate object such as equipment or an item such as a weapon or a guard that appears in the game, or to which the appearance of the inanimate object is attached.

Figure 2:
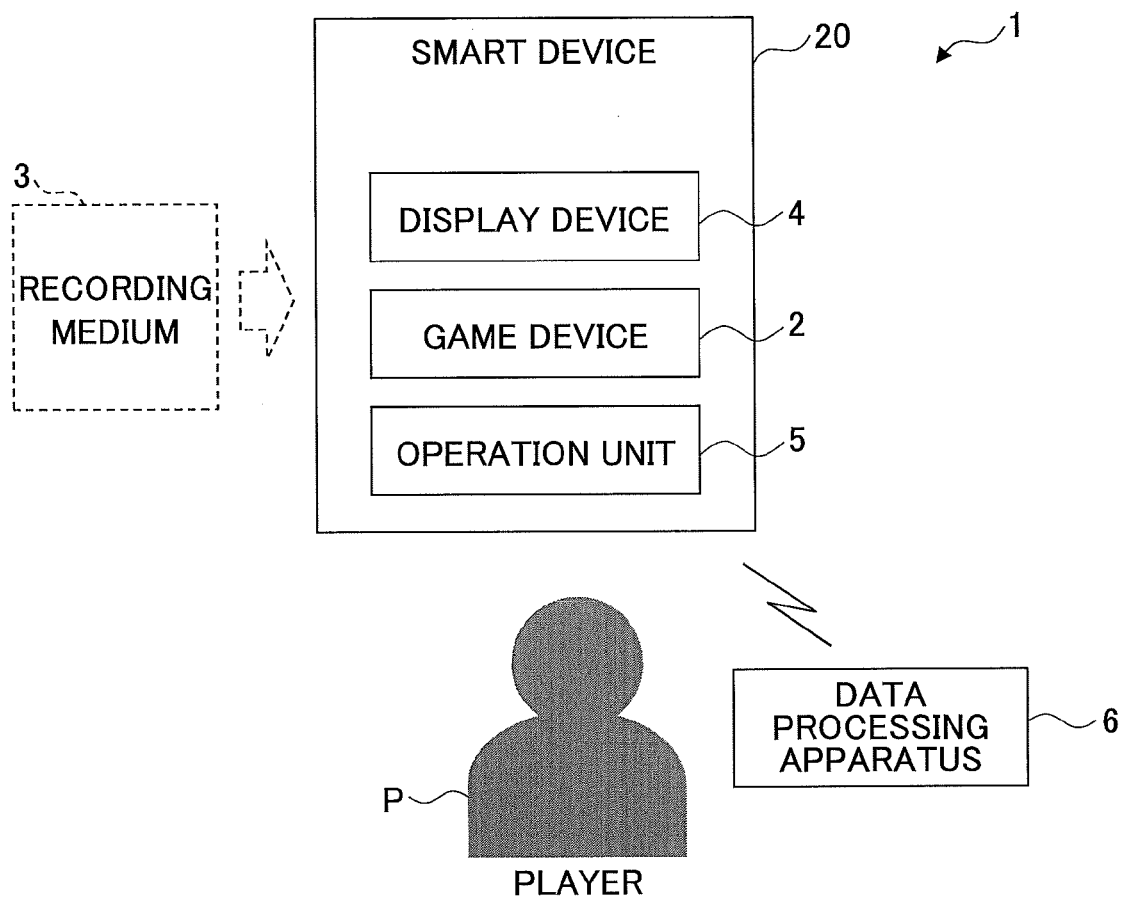
FIG. 2 is a view illustrating another example of the structure of the game system of an embodiment.

FIG. 2 is a view illustrating another example of the structure of the game system 1. The game system 1 includes a smart device 20 such as a smartphone or a tablet that has functions of the game device 2, the display device 4 and the operation unit 5. The display device 4 and the operation unit 5 are actualized by a display panel including a touch panel. In such a case as well, the smart device 20 may substantially be the game device. Other structures are the same as those illustrated in FIG. 1.

Figure 3:
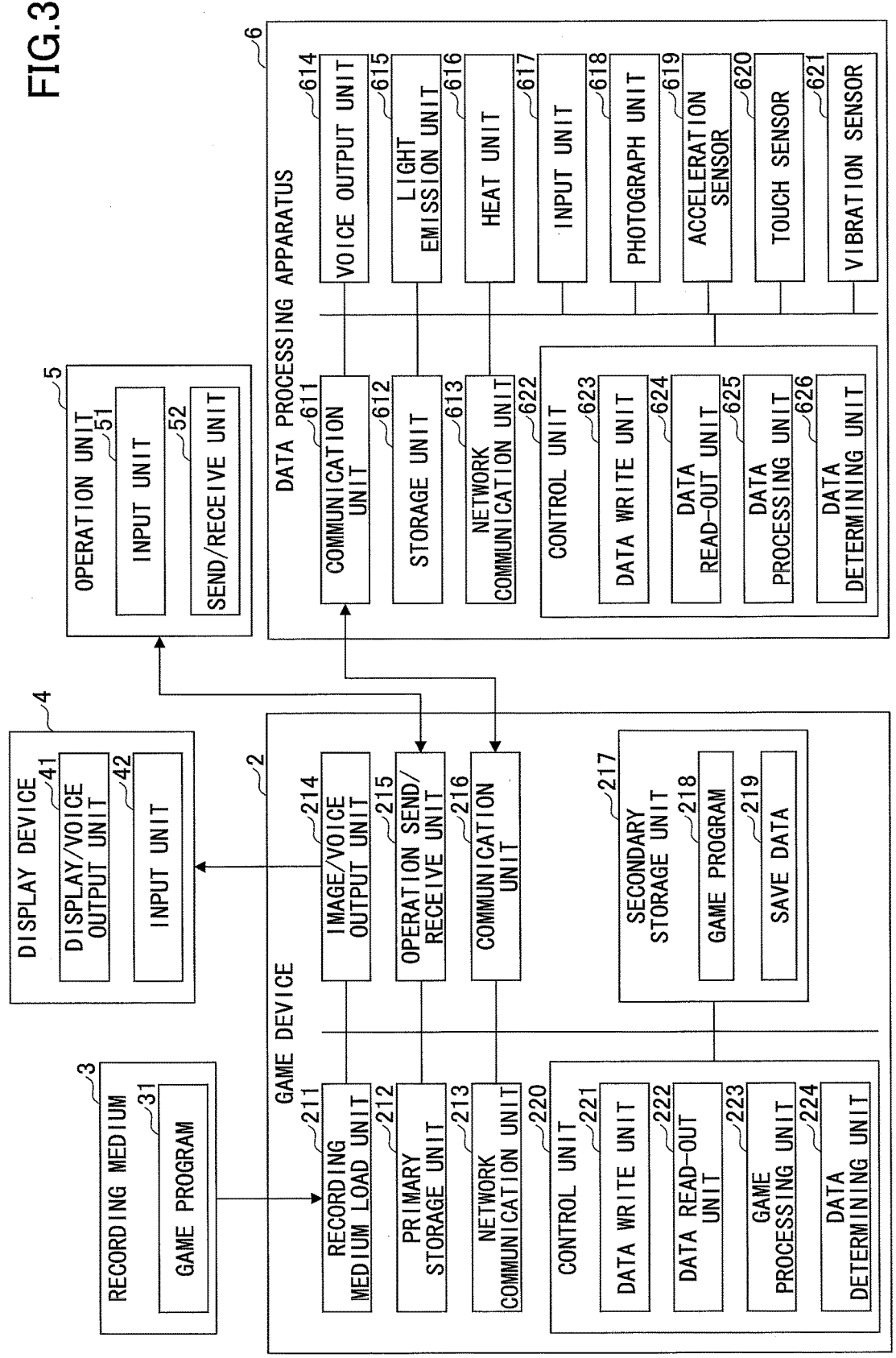
FIG. 3 is a view illustrating an example of an internal structure of each device.

FIG. 3 is a view illustrating an example of an internal structure of each device. The game device 2 includes a recording medium load unit 211, a primary storage unit 212, a network communication unit 213, an image/voice output unit 214, an operation send/receive unit 215, a communication unit 216, a secondary storage unit 217 and a control unit 220. The secondary storage unit 217 stores a game program 218 and save data 219.

The control unit 220 includes a data write unit 221, a data read-out unit 222, a game processing unit 223 and a data determining unit 224.

The recording medium 3 stores a game program 31. The display device 4 includes a display/voice output unit 41 and an input unit 42. The operation unit 5 includes an input unit 51 and a send/receive unit 52.

The data processing apparatus 6 includes a communication unit 611, a storage unit 612, a network communication unit 613, a voice output unit 614, a light emission unit 615, a heat unit 616, an input unit 617, a photograph unit 618, an acceleration sensor 619, a touch sensor 620, a vibration sensor 621 and a control unit 622. The control unit 622 includes a data write unit 623, a data read-out unit 624, a data processing unit 625 and a data determining unit 626. Although not illustrated in FIG. 3, the data processing apparatus 6 may further include a display unit.

The recording medium load unit 211 of the game device 2 receives loading of the recording medium 3 such as a CD-ROM, a DVD-ROM or a flash memory. The recording medium load unit 211 has a function to read out the game program 31 from the recording medium 3. The primary storage unit 212 functions as a primary memory (main memory) by a Random Access Memory (RAM). The read out game program 31 in the recording medium 3 or the game program 218 in the secondary storage unit 217 is stored in the primary storage unit 212, and the primary storage unit 212 is used as a working area when executing the game program. The network communication unit 213 has a function to perform data communication with an external device via a network such as Internet.

The image/voice output unit 214 has a function to output signals of video and a voice of the game to the display device 4. The operation send/receive unit 215 has a function to receive operation data of the player P from the operation unit 5, and send control data to the operation unit 5. The communication unit 216 has a function to perform wired or wireless data communication between the data processing apparatus 6. For the wireless data communication, infrared-ray communication, ad hoc communication (ad hoc mode), Wi-Fi (registered trademark), Bluetooth (registered trademark) or the like may be used, for example. The secondary storage unit 217 functions as a secondary memory (auxiliary memory) by a Hard Disk Drive (HDD), a Solid State Drive (SSD) or the like. The secondary storage unit 217 stores the game program 218 and the save data 219 that is saved while the game is performed. The game program 218 may be downloaded via the network, or may be read out from the recording medium 3.

The control unit 220 has a function to control the entirety of the game device 2 by a Central Processing Unit (CPU) or the like. The data write unit 221 has a function to write data in the primary storage unit 212 or the secondary storage unit 217. The data read-out unit 222 has a function to read out data from the primary storage unit 212 or the secondary storage unit 217. The game processing unit 223 has a function to perform processes for causing the game to progress (including a process for cooperating with the data processing apparatus 6) in accordance with an operation from the player P based on the game program 31 or the game program 218. The data determining unit 224 has a function to determine whether various data that are changed in accordance with the progression of the game satisfy various predetermined conditions to control the game device 2.

Further, the game device 2 may further include a photograph unit such as a camera, and may obtain image/video data that becomes a material for determining a status of a surrounding of the game device 2 including the player P and the data processing apparatus 6.

The display/voice output unit 41 of the display device 4 has a function to display video and output a voice to the player P based on signals of video and a voice of the game sent from the game device 2. The input unit 42 has a function to input signals of video and a voice of the game from the game device 2.

The input unit 51 of the operation unit 5 has a function to accept an operation from the player P. The send/receive unit 52 has a function to send and receive operation data and control data between the game device 2.

The communication unit 611 of the data processing apparatus 6 has a function to perform wired or wireless data communication with the game device 2. The storage unit 612 stores data handled in the data processing apparatus 6 by a RAM or an SSD. The network communication unit 613 has a function to perform data communication with an external device via a network such as Internet or the like.

The voice output unit 614 has a function to output a voice from a speaker. The light emission unit 615 has a function to emit light by a ramp such as a Light Emitting Diode (LED). The light emission unit 615 may notify data of different meanings to the player P by changing light emission color, light emission timing or light emission interval. The heat unit 616 has a function to generate heat by a heater or the like. Further, the data processing apparatus 6 may include a cooling function. The function such as heating or cooling is appropriate when the data processing apparatus 6 is something that the player P can wear such as a ring so that it is possible to call attention of the player P.

Further, from the viewpoint of informing information to the player P, for example, the data processing apparatus 6 may include a drive unit such as a motor and wheels connected to the drive unit so that the data processing apparatus 6 itself can travel. Further, when the data processing apparatus 6 is a stuffed toy or the like, a mechanism capable of adjusting air pressure may be provided in the stuffed toy or the like, and the change may be made such as an appearance of the stuffed toy is inflated/deflated by adjusting the air pressure. With this, it is possible to call attention of the player P, and increase the entertainment of the game by three-dimensionally expressing the game worldview or the characteristic of the character in the game.

The input unit 617 has a function to accept an operation from the player P by a button operation or a touch operation. Further, the data processing apparatus 6 may further include a sound receive unit such as a microphone. The photograph unit 618 has a function to photograph a surrounding of the data processing apparatus 6. It is also possible to read a barcode (including a two-dimensional code) put up at an external facility or the like by the photograph unit 618. The acceleration sensor 619 has a function to detect acceleration applied to the data processing apparatus 6. The touch sensor 620 has a function to detect touch to the data processing apparatus 6 by the player P. The vibration sensor 621 has a function to detect vibration of the data processing apparatus 6. In addition, the data processing apparatus 6 may further include a receive unit for Global Positioning System (GPS) that obtains positional data.

The control unit 622 controls the entirety of the data processing apparatus 6 by a CPU or the like. The data write unit 623 has a function to write data in the storage unit 612. The data read-out unit 624 has a function to read out data from the storage unit 612. The data processing unit 625 has a function to perform a data processing of the data processing apparatus 6. The data determining unit 626 has a function to determine whether various data stored in the data processing apparatus 6 satisfy various predetermined conditions to control the data processing apparatus 6.

(Example of Overall Process)

The player P activates the data processing apparatus 6 almost at the same time as the player P activates the game device 2. When the player P activates the game program 31 stored in the recording medium 3, that is loaded at the recording medium load unit 211 of the game device 2, or the game program 218 stored in the secondary storage unit 217, the control unit 220 causes the game to progress in accordance with content of the game program 31 or 218. In accordance with the progression of the game, game images are displayed and game voices are output by the display/voice output unit 41 of the display device 4 connected to the image/voice output unit 214 of the game device 2 via the input unit 42. When the player P grips the operation unit 5 and performs an operation such as pressing a button, which is the input unit 51 or the like, for example, the operation content is sent to the game device 2 via the send/receive unit 52. When the game device 2 receives the operation data (operation content) via the operation send/receive unit 215, the control unit 220 controls the game progression in accordance with the operation content, and outputs the result to the display device 4.

It is assumed that the game is to beat a monster in a virtual three-dimensional space, for example, and there are a player character operated by the player P, a support character who supports the player character and a monster character that the player character is to beat exist in the game space. In such a case, when the player character departs from a base area (own area) in the game space in accordance with the operation by the player P, it is assumed that the support character controlled by the control unit 220 of the game device 2 stays in the base area in the game space. The support character supports the player character when the player character returns to the base area by filling or trading items, recovering hit points status value or the like.

Meanwhile, the player P possesses the data processing apparatus 6 that is connected to the game device 2 by wired or wireless communication means in an actual space. The data processing apparatus 6 is a doll or a stuffed toy that has an appearance of the support character, for example.

The player P previously obtains information regarding hints-and-tips of the game from a server (not illustrated in the drawings) via Internet via the network communication unit 213 of the game device 2 or via the network communication unit 613 of the data processing apparatus 6, and the information regarding hints-and-tips of the game is stored in the secondary storage unit 217 of the game device 2 or the storage unit 612 of the data processing apparatus 6. The information regarding hints-and-tips of the game may be one obtainable as a so-called electronic book (e-book). In such a case, normally, the information regarding hints-and-tips of the game may be readable as an e-book by the game device 2 and the display device 4, and when the game is being played, a part of or all of data of the e-book may be used as the information regarding hints-and-tips of the game.

When the player character proceeds in the game space, there may be a dead angle by an obstacle such as a wall, a mountain or the like. In such a case, a monster character may hide in the dead angle. This information that the monster character is hidden in the dead angle is included in the information regarding hints-and-tips of the game, for example.

When the progression data of the game satisfies a specific condition by the data communication between the game device 2 and the data processing apparatus 6 (for example, a condition that the player character reaches a point where the monster character is hidden), the control unit 622 of the data processing apparatus 6 controls the voice output unit 614 to output a voice such as "an enemy hides in a right-front direction" based on the information regarding hints-and-tips of the game stored in the storage unit 612, for example, to call attention of the player P.

In this embodiment, the player P can feel as if the support character, who originally supports the player character only at the base area in the game space, attends an adventure with the player character, and the immersion in the game can be increased.

(Detail of Process)
(Process of Data Processing Apparatus in Accordance with Progression Status of the Game)

Figure 4:
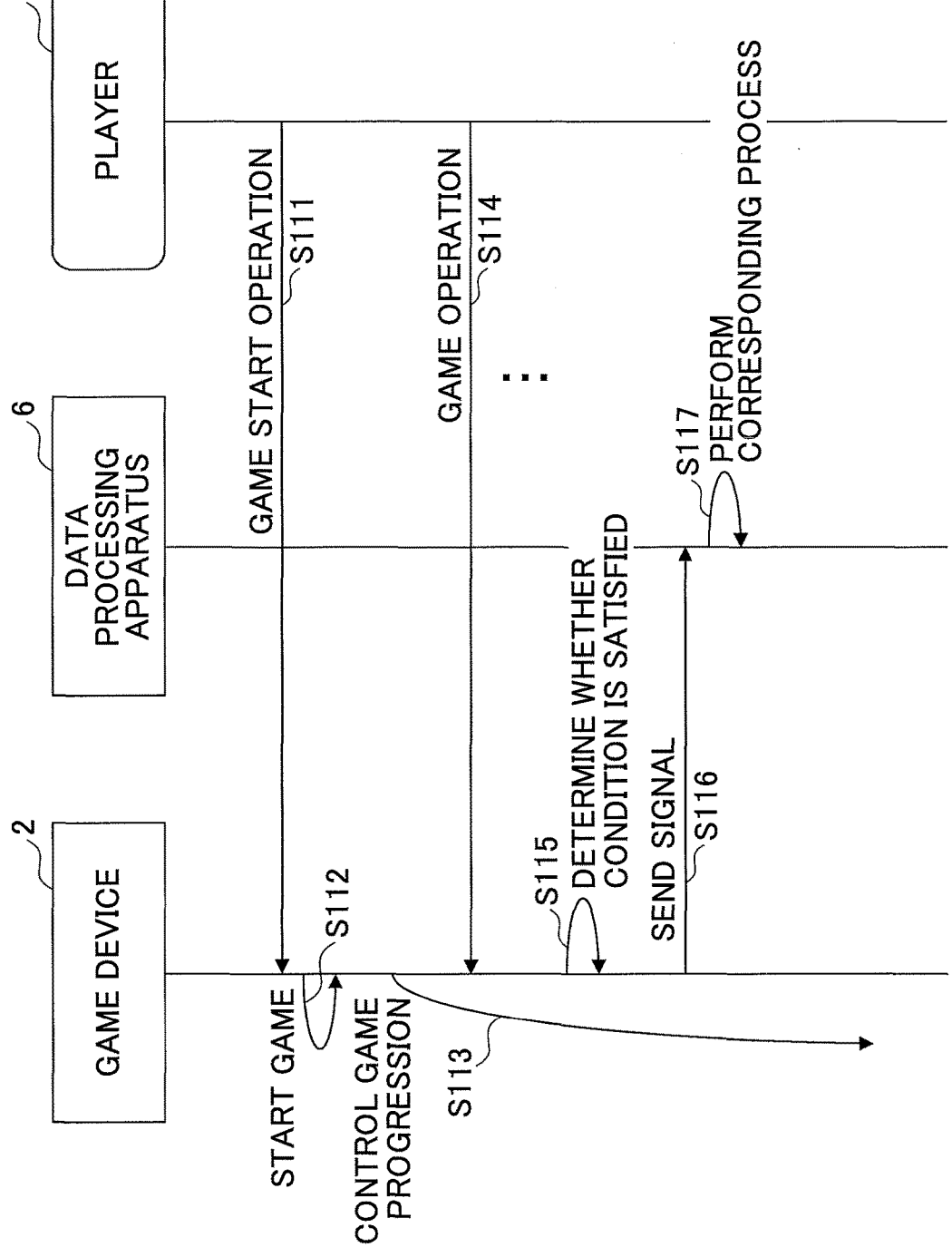
FIG. 4 is a sequence diagram (No. 1) illustrating an example of a process of the embodiment.

FIG. 4 a sequence diagram illustrating an example of a process of the above embodiment. In FIG. 4, when the player P activates the game device 2 and operates to start the game (step S111), the game device 2 starts the game (step S112), and the control unit 220 controls the game progression (step S113). When the player P performs a game operation under the control of the game progression (step S114), the game operation is reflected to the game progression. Here, it is assumed that the player P also activates the data processing apparatus 6 before or after activating the game device 2.

Further, the control unit 220 of the game device 2 stores data of a predetermined condition as game related information therein, and controls the data determining unit 224 to determine whether the game progression satisfies the predetermined condition. When it is determined that the predetermined condition is satisfied (step S115), the communication unit 216 sends a predetermined signal to the data processing apparatus 6 (step S116). In the data processing apparatus 6, when the communication unit 611 receives the signal from the game device 2, the control unit 622 performs a corresponding predetermined process (step S117).

The predetermined condition determined in the game device 2 is, for example, a condition that is satisfied when an advantageous status or a disadvantageous status for the player P happens or seems to happen in the game. More specifically, for example, the advantageous status is a condition that is satisfied when an obtainable item is hidden in the dead angle of the player P in the game. In such a case, the process performed by the data processing apparatus 6 is, for example, outputting a voice such as "please check a shade of the pillar at the upper left" by the voice output unit 614 based on previously stored plurality of patterns of conversation data, emitting light by the light emission unit 615, or generating heat by the heat unit 616. With this, it is possible to previously notify the player P of the advantageous status, and give a chance for the player P to use the advantageous status.

Further, more specifically, for example, the disadvantageous status is a condition that is satisfied when a monster character is hidden in the dead angle of the player P in a direction to which the player character proceeds in the game. In such a case, the process performed by the data processing apparatus 6 is, for example, outputting a voice such as "there is an enemy in a front shade" by the voice output unit 614 based on the previously stored plurality of patterns of conversation data, emitting light by the light emission unit 615, or generating heat by the heat unit 616. With this, it is possible to previously notify the player P of the disadvantageous status, and give a chance to the player P to avoid the disadvantageous status. Here, when the notification is performed by emitting the light, the light emission pattern may be changed for the disadvantageous status and the advantageous status by changing the light emission color, the length of the light emission, or the cycle of the intermittence of the light emission. With this configuration, the player P can easily grasp whether either of the advantageous or the disadvantageous status is occurring.

Further, when the data processing apparatus 6 has an appearance of the support character who supports the player character in the game, the player P can receive an impression as if the advice is given by a friend of the player P in a specific situation of the game, and the immersion in the game can be increased.

On the other hand, for a player who wants to play the game without easily obtaining information such as hints-and-tips of the game, it is preferable that the information is output from the data processing apparatus 6 only when the player P requires the information. In such a case, for example, when the player P performs a specific operation on the game, or speaks to the data processing apparatus 6 as "please tell me a direction of an exit", the data processing apparatus 6 may output the game related information.

Here, the game related information including the predetermined condition to be determined by the game device 2 may be previously stored in the storage unit (the primary storage unit 212 or the secondary storage unit 217) of the game device 2, or when the game is performed by loading the recording medium 3 such as a CD-ROM or a DVD-ROM storing the game program to the game device 2, the game related information may be stored in the CD-ROM, the DVD-ROM or the like. Further, the game related information may be downloaded from a network such as Internet or the like by an operation of the player P or by the control unit 220 of the game device 2.

Further, the game related information may be included in an e-book that can be downloaded from a server via the network. In such a case, the e-book is not only used for obtaining the game related information, but can be used for the player P to read by the game device 2 by the operation of the player P, independently from the progression of the game. With this configuration, the player P can furthermore utilize the e-book data purchased by the player P. Not only reading it as a book, the player P can automatically obtain the information regarding hints-and-tips of the game such as the information regarding the above described disadvantageous or advantageous status in accordance with the progression of the game by the data processing apparatus 6.

(Process of Data Processing Apparatus Based on Nature Data)

The data processing apparatus 6 may store nature data set to include nature of a specific character in the game. In such a case, the predetermined process performed by the data processing apparatus 6 may be a process of providing data based on the nature data.

The nature data is data indicating nature of a specific character (including an inanimate object, equipment or the like that has a same role as an animate object in a context of a story in addition to an animate object such as a human being or an animal) that appears in the game. For example, for the data processing apparatus 6 that has an appearance of a friend character who appears in the game and has "quiet nature" compared with other characters, nature data of "quiet nature" is set for the character. When such nature data is set, the data processing apparatus 6 may be controlled that a message output from the data processing apparatus 6 has less words, compared with those of other characters. With this configuration, the player P can receive an impression as if the player P is having a conversation with the respective character in the game. Further, for a case when the data processing apparatus 6 is a toy or the like that has an appearance of a weapon that appears in the game, and an effect occurs in the game such as the weapon in the game emits light based on a magic power provided to the weapon in accordance with the progression of the game, the way of emitting the light by the data processing apparatus 6 may be controlled based on nature data set for the weapon. With this, the entertainment of the game for the player P can be increased.

The above described nature data may be previously stored in the storage unit 612 of the data processing apparatus 6, obtained from the game device 2 to be set, or downloaded from a server via the network such as Internet.

Further, the nature data may be changed based on game play content by the player P, and the number of outputting times or the outputting amount from the data processing apparatus 6 may be influenced by the game play content by the player P. For example, when intimacy with the specific character is increased in the game, the nature data may be changed. For the "quiet nature", if the intimacy increases, the degree of "quiet nature" is weakened, and the number of messages or the amount of messages that the data processing apparatus 6 output gradually increases.

Here, output from the data processing apparatus 6 may be changed based on the game play content or the game play result of the player P, in addition to be based on the nature data.

(Process by Trigger at Data Processing Apparatus)

Figure 5:
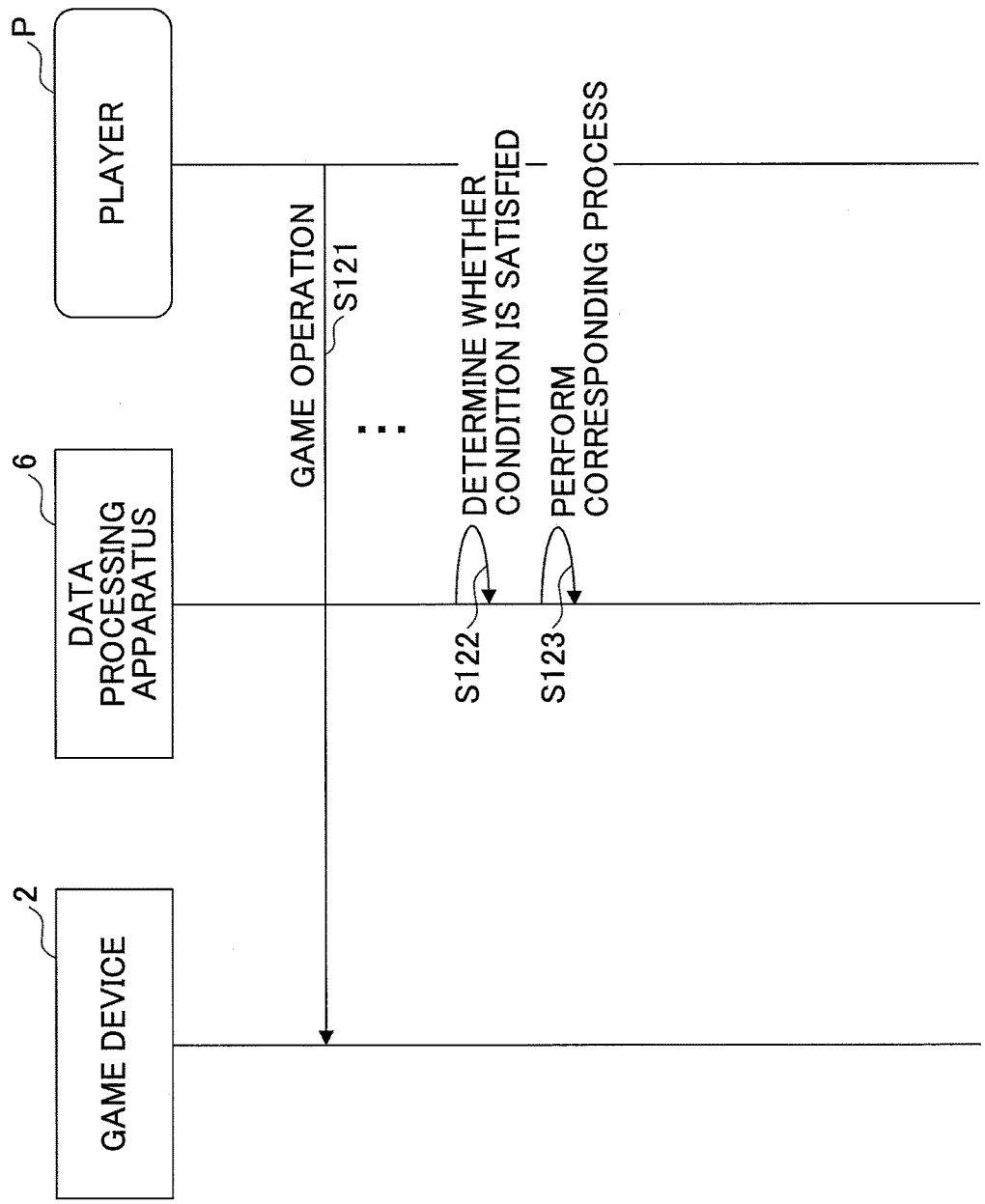
FIG. 5 is a sequence diagram (No. 2) illustrating an example of a process of the embodiment.

FIG. 5 illustrates an example of a process by a trigger at the data processing apparatus 6. In FIG. 5, in parallel to the game progression by the game operation by the player P (step S121), when the control unit 622 of the data processing apparatus 6 determines that the predetermined condition is satisfied (step S122), the control unit 622 of the data processing apparatus 6 performs the predetermined process (step S123).

For example, the data processing apparatus 6 may receive a voice output from a speaker of the game device 2 or the display device 4 by a sound receive unit such as a microphone or the like. In such a case, when the received voice matches a pattern (musical interval, melody, message or the like) or the like that is previously set by the predetermined condition, the control unit 622 of the data processing apparatus 6 determines that the predetermined condition is satisfied and performs appropriate output. For example, upon accepting a message from the character in the game, the data processing apparatus 6 may add a comment or a concurring opinion of the message. Alternatively, the data processing apparatus 6 may move as if dancing to the music played in the game, or emit light from the light emission unit 615 in accordance with the music or the like.

Further, when the player P directly speaks to the data processing apparatus 6, or performs an input operation by a key or a button of the input unit 617 provided in the data processing apparatus 6, the data processing apparatus 6 may be configured to perform output in accordance with the input by the player P.

(Reflection to Game Progression by Trigger at Data Processing Apparatus)

Figure 6:
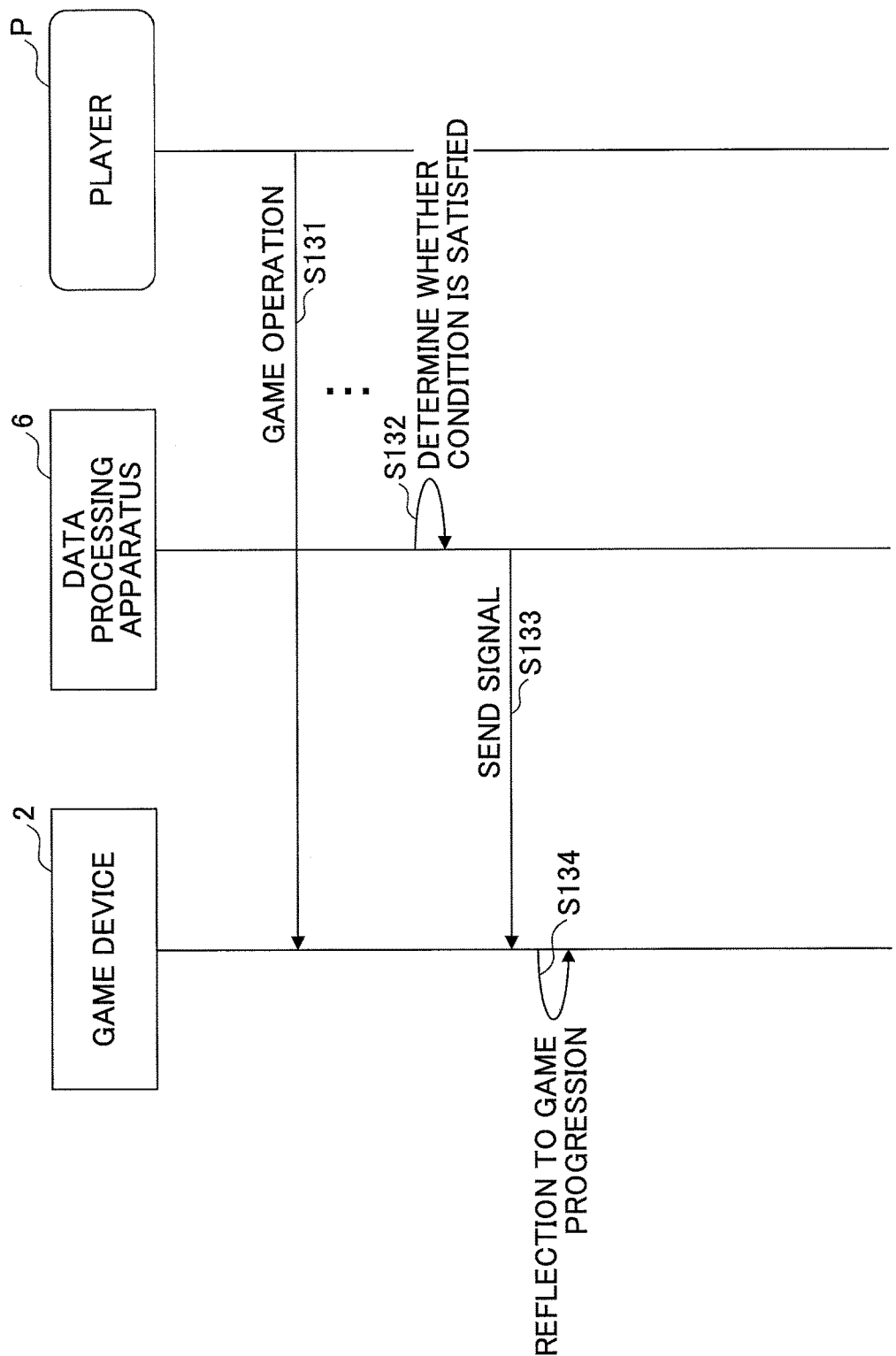
FIG. 6 is a sequence diagram (No. 3) illustrating an example of a process of the embodiment.

FIG. 6 illustrates an example of a process of reflection to game progression by a trigger at the data processing apparatus 6. Between the game device 2 and the data processing apparatus 6, in addition to an embodiment that data is sent from the game device 2 to the data processing apparatus 6, data may be sent from the data processing apparatus 6 to the game device 2, and here, the latter case is used.

In FIG. 6, in parallel to the game progression by the game operation by the player P (step S131), when the control unit 622 of the data processing apparatus 6 determines that the predetermined condition is satisfied (step S132), the communication unit 611 sends a predetermined signal to the game device 2 (step S133). When the communication unit 216 of the game device 2 receives the signal from the data processing apparatus 6, the control unit 220 reflects it to the game progression (step S134).

For example, the data processing apparatus 6 may store nature data of a specific character in the game in the storage unit 612, send a signal to the game device 2 based on a condition related to the nature data, and control the game to change a status in the game. More specifically, it is assumed that the data processing apparatus 6 has an appearance of a female character who appears in the game, and the nature data such as character, personality, tone or the like of the female character in the game is stored in the data processing apparatus 6. In such a case, if "a scene that the female character may be ashamed of" is displayed in the game, the data processing apparatus 6 sends a specific signal to the game device 2 based on the pseudo-feeling that the female character may feel. Then, regardless of the operation by the player P, the game device 2 controls to skip the scene or the like, for example.

Further, when the female character appears in the game as well, a specific signal is sent from the data processing apparatus 6 to the game device 2 based on the pseudo-feeling that the female character may feel, and the game device 2 controls to affect the movement or the conversation of the female character in the game, for example.

(Reflection to Game Progression by Trigger at Game Device)

When a photograph unit is provided in the game device 2, it is possible to take a photo of the surrounding of the game device 2 including the player P and the data processing apparatus 6 to obtain data of a photographed image, or photographed video. Then, for example, when the control unit 220 of the game device 2 determines that the player P wears an accessory type data processing apparatus 6 based on the data of the photographed image, or the photographed video, it is possible to change the game progression to correspond to the situation.

Further, with the reflection to game progression, or instead of the reflection to game progression, the game device 2 may send a signal to the data processing apparatus 6 and controls the data processing apparatus 6 to perform a process corresponding to the determined status. For example, it is possible to control the data processing apparatus 6 of a character type, which receives the signal output from the game device 2, to output a specific message.

(Change of Process by Additional Device)

The data processing apparatus 6 may not be used alone, but may be used with an additional device, that is provided separately from the data processing apparatus 6 and is capable of being connected to the data processing apparatus 6 (including being held, worn or the like by the data processing apparatus 6). The data processing apparatus 6 may be controlled by connecting such an additional device to the data processing apparatus 6 and may be controlled differently compared with a case when the data processing apparatus 6 is used alone. For example, when the data processing apparatus 6 is a doll that has an appearance of a character in the game who gives an advice to the player P, and has a function to output hints-and-tips of the game in accordance with the progression of the game, the additional device may be an attachment or the like having a shape of a book, for example. In such a case, by connecting the additional device to the data processing apparatus 6 (having the doll grip the book, for example), the data processing apparatus 6 may be controlled to increase the output amount of the hints-and-tips of the game.

Further, when the additional device is configured to include an output unit, the data processing apparatus 6 may control the output unit of the additional device to perform an output function. For example, it is assumed that the additional device has a shape of a rod and includes a light emission unit as the output unit at a front end of the rod, and the data processing apparatus 6 is a doll having an appearance of a character. In such a case, when connecting the additional device to the data processing apparatus 6 (having the doll hold the rod), additional output may be performed. For example, it is possible to control the data processing apparatus 6 to output the hints-and-tips of the game by a voice or the like, and to control the light emission unit of the additional device to emit light by changing the strength of the light in accordance with a positional relationship between a player operated character and an enemy character, at the same time.

(Process When Plurality of Data Processing Apparatuses Exist)

When the player P possesses a plurality of the data processing apparatuses 6, the player P may select either of the game data processing apparatuses 6 to be activated by an operation in the game. For example, when the game device 2 detects a plurality of the data processing apparatuses 6 when stating the operation or at predetermined timing, the game device 2 may display a menu or the like for the player P to select one or more data processing apparatuses 6 to be activated, and accept selection. In such a case, in accordance with a system design, the game device 2 may cause the player P to select one data processing apparatus 6, or a plurality of data processing apparatuses 6 capable of being used at the same time.

(Process after Game is Finished)

Figure 7:
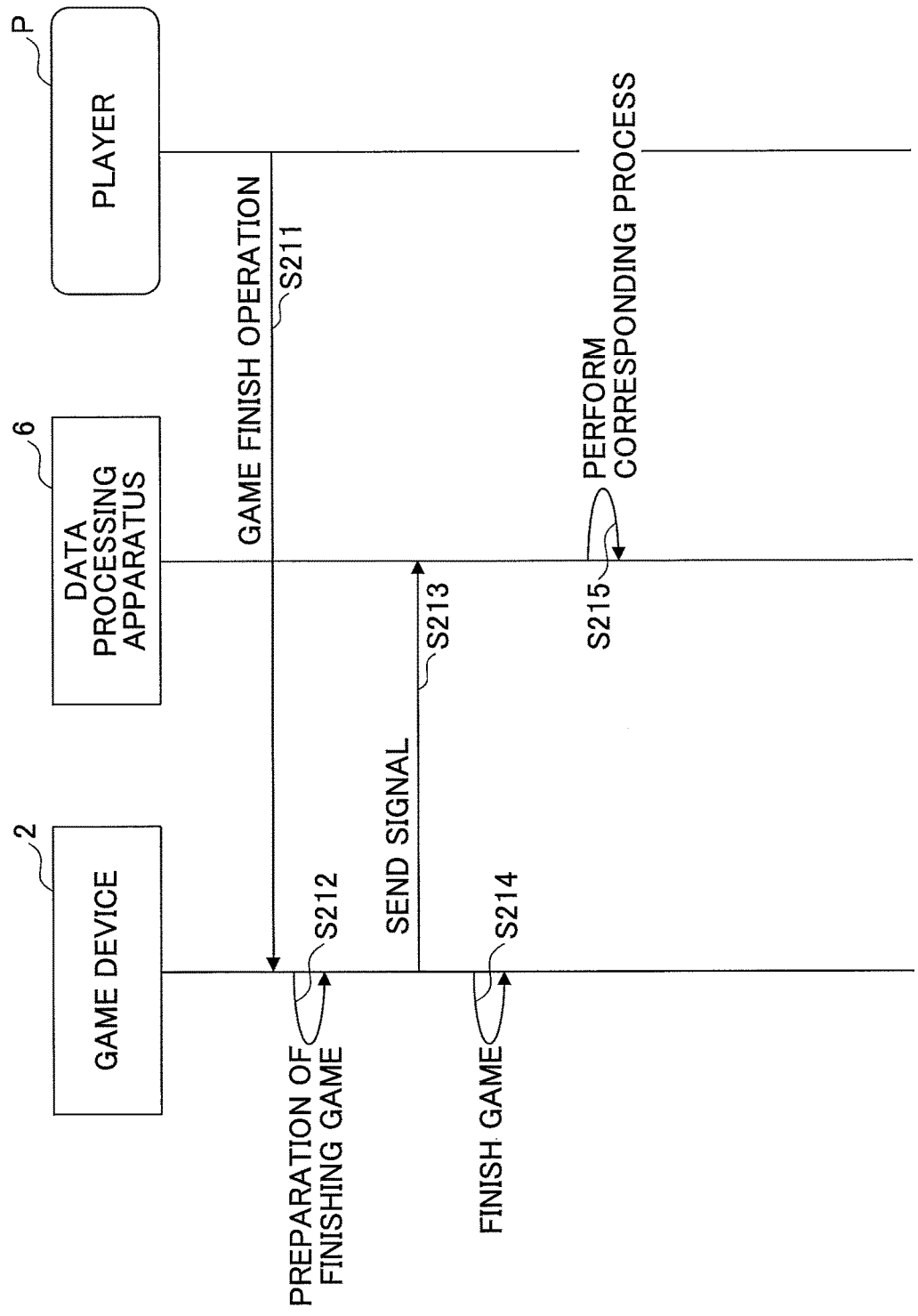
FIG. 7 is a sequence diagram (No. 4) illustrating an example of a process of the embodiment.

FIG. 7 illustrates an example of a process after the game by the game device 2 is finished. In FIG. 7, when the player P operates the game device 2 to finish the game (step S211), the game device 2 starts preparation of finishing the game (step S212). During the process, the game device 2 outputs a predetermined signal to the data processing apparatus 6 (step S213), and finishes the process thereafter (step S214).

Upon receiving the signal from the game device 2, the data processing apparatus 6 stores data included in the received signal in the storage unit 612 and performs a process corresponding to the received signal (step S215). This process may be performed right after the game is finished in the game device 2, or may be performed when the predetermined condition is satisfied.

Data regarding the game program that is performed right before the finishing operation of the game is performed may be included in the signal that is output to the data processing apparatus 6 from the game device 2 when finishing the game device 2. For example, as the data regarding the game program, nature data of the character that appears in the game or status data regarding the progression of the game when finishing the game may be included. In such a case, even after the game device 2 is switched off, the data processing apparatus 6 can output evaluation or a comment of the performed game content so far of the player P, hints regarding the game progression thereafter or the like to the player P.

Further, the control unit 622 of the data processing apparatus 6 may have an artificial intelligence function. In such a case, when the player P performs an input operation such as talking to the data processing apparatus 6, the control unit 622 may interpret the talked content, and may output an appropriate replay based on the data regarding the game program stored in the storage unit 612 or the like.

Further, the data processing apparatus 6 may include a clock (a clock mechanism), and compare the date and time when the game is finished and current date and time. Then, when the interval between the current date and time and the date and time when the game is finished exceeds a threshold value of previously set time interval, the data processing apparatus 6 may encourage the player P to activate the game device 2 and restart the game by voice output or the like.

(Automatically Obtaining Data by Data Processing Apparatus While Game is not Performed)

In FIG. 8, the data processing apparatus 6 obtains specific data regarding the game, which is played last by the player P (current period, advantageous information for the player P such as some campaigns are provided, for example) from an external site via Internet or the like, while the game device 2 is terminated (switched off) (step S221, S222).

Then, the data processing apparatus 6 may output the specific data to the player P at appropriate timing (step S223). With this configuration, the player P who obtains the data may be motivated to restart the game. Here, the data processing apparatus 6 may obtain the specific data and output it to the player P while the game device 2 is being operated.

(Reflection to Game Progression of Input Operation to Data Processing Apparatus While Game is not Performed)

In FIG. 9, when the player P performs an input operation to the data processing apparatus 6 while the game device 2 is terminated (step S231), the control unit 622 of the data processing apparatus 6 stores an input data amount or input frequency to the input unit 617 in the storage unit 612 (step S232). For example, the data processing apparatus 6 may store nature data of a human character in the game that is obtained when the game is finished. Then, the data processing apparatus 6 store the number of times that the player P talks (performs voice input) to the data processing apparatus 6 after the game is finished until the game is activated again.

Thereafter, when the player P activates the game device 2 to restart the game (step S233), the game device 2 sends a signal indicating that the game is started from the communication unit 216 to the data processing apparatus 6 (step S234). Upon receiving the signal by the communication unit 611, the control unit 622 of the data processing apparatus 6 sends the data that is stored while the game is not played to the game device 2 (step S235). Here, alternatively, when the data processing apparatus 6 is configured to periodically send a signal to the game device 2 for confirming whether the game device 2 is activated or the like, the signal indicating that the game is started may not be sent from the game device 2.

Then, upon receiving the data by the communication unit 216, the game device 2 reflects the received data to the game progression by the control unit 220 (step S236). For example, when the number of times that the player P talks to the data processing apparatus 6, which has the nature data of the human character, exceeds a previously set threshold value, the game device 2 may control to have the respective character in the game to speak a specific conversation, increase a status value of intimacy of the character in the game to the player operated character or the like.
(Reflection to Game Progression by Input Operation to Data Processing Apparatus While Game is being Performed)

In FIG. 10, when the player P performs an input operation of physically contacting the data processing apparatus 6 while the game is being performed by the game device 2 (step S311), the touch sensor 620 or the vibration sensor 621 of the data processing apparatus 6 detects the contact itself, or the vibration by the contact. In such a case, the control unit 622 of the data processing apparatus 6 stores data regarding frequency of the contact or a period of the contact in the storage unit 612 (step S312).

The control unit 622 of the data processing apparatus 6 outputs the stored data regarding the frequency of the contact or the period of the contact to the game device 2 at predetermined timing thereafter (every constant cycle, when the frequency of the contact or the period of the contact satisfies the predetermined condition, or the like) (step S313).

Then, upon receiving the data by the communication unit 216, the game device 2 reflects the received data to the game progression by the control unit 220 (step S314).

For example, when the data processing apparatus 6 is a stuffed toy having an appearance of a pet, the control to the character may be different based on the number of times or the period that the player P pats the head of the stuffed toy.
(Reflection of Current Position of Data Processing Apparatus to Game Progression)

When the data processing apparatus 6 can obtain current positional data of the data processing apparatus 6 in a real world by a function of GPS or the like, control using the current positional data may be performed.

In FIG. 11, when the data processing apparatus 6 receives current positional data from GPS (step S321), the data processing apparatus 6 stores the current positional data therein (step S322).

The control unit 622 of the data processing apparatus 6 sends the stored current positional data to the game device 2 at predetermined timing thereafter (every constant cycle or the like) (step S323).

Then, upon receiving the data by the communication unit 216, the game device 2 reflects the received data to the game progression by the control unit 220 (step S324).

For example, when the data processing apparatus 6 is in New York City in the United States, it may be controlled such that a character related to New York City may appear in the game, or the possibility that the character related to New York City appears in the game is increased.
(Reflection to Game Progression by Data Obtained by Data Processing Apparatus from External Device)

In FIG. 12, when the data processing apparatus 6 receives specific data sent from an external device provided in a real world (step S331), the data processing apparatus 6 stores the specific data therein (step S332).

The control unit 622 of the data processing apparatus 6 sends the stored specific data to the game device 2 at predetermined timing thereafter (instantly, every constant cycle or the like) (step S333).

Then, upon receiving the data by the communication unit 216, the game device 2 reflects the received data to the game progression by the control unit 220 (step S334).

For example, it is assumed that the data processing apparatus 6 is easy to carry such as an accessory, a small stuffed toy or a doll. Meanwhile, it is assumed that an external device that outputs specific data is provided at the place at which a concert, an event or the like related to the game is held, and only the player P who brings the data processing apparatus 6 to the concert, the event or the like can obtain the specific data from the external device. As a result, control such as only the player P who participates in the concert, the event or the like can obtain a specific item in the game may be performed.
(Reflection to Game Progression by Photographed Image or Photographed Video by Data Processing Apparatus)

In FIG. 13, when an image or a video is photographed by the photograph unit 618 of the data processing apparatus 6 (step S341), data obtained by analyzing the photographed image or the photographed video is stored in the data processing apparatus 6 (step S342).

The control unit 622 of the data processing apparatus 6 sends the stored data to the game device 2 at predetermined timing thereafter (instantly, every constant cycle or the like) (step S343).

Then, upon receiving the data by the communication unit 216, the game device 2 reflects the received data to the game progression by the control unit 220 (step S344).

For example, the data processing apparatus 6 may read various QR codes (registered trademark) or barcodes in real world, or photograph scenes in the town in real world and analyze the photograph to obtain data. Then, the data processing apparatus 6 may send a specific signal based on the data to the game device 2 so that the progression of the game is controlled to reflect the specific signal.
(Reflection to Game Progression by Change of Acceleration of Data Processing Apparatus)

In FIG. 14, when the player P physically moves the data processing apparatus 6 itself (step S351), the acceleration sensor 619 of the data processing apparatus 6 detects acceleration by the movement. The control unit 622 of the data processing apparatus 6 stores acceleration data (such as magnitude, frequency, the number of times of the acceleration) in the storage unit 612 (step S352).

The control unit 622 of the data processing apparatus 6 sends the stored acceleration data to the game device 2 at predetermined timing thereafter (instantly, every constant cycle, when the acceleration data satisfies the predetermined condition or the like) (step S353).

Then, upon receiving the data by the communication unit 216, the game device 2 reflects it to the game progression based on the received data by the control unit 220 (step S354).

For example, the data processing apparatus 6 has an appearance of a weapon (a sword or the like) that appears in the game, then, the player P may swing the data processing apparatus 6. In such a case, the data processing apparatus 6 may obtain the strength or the number of times of the swinging by the player P, and send specific data based on the obtained data to the game device 2. Then, the game device 2 may reflect the content to the progression of the game.

SUMMARY

As described above, according to the embodiment, it is possible to improve immersion in a game or entertainment of the game for a player by using a data processing apparatus separately provided from a game device. In other words, it is possible to provide the immersion in the game and the entertainment of the game as if the player can enjoy the game with a character in the game and live with the character in the game.

According to the embodiment, it is possible improve the immersion in the game or the entertainment of the game for the player by using the data processing apparatus separately provided from the game device.

The individual constituents of the game device 2 or the data processing apparatus 6 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

Although a preferred embodiment of the game system, the game device and the data processing apparatus has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. A game system comprising:
   a game device at least including a control unit, a storage unit, an output unit, an input unit and a send unit;
   a display device, integrally formed with the game device or separately formed from the game device, at least including an input unit connected to the game device and a display unit; and
   a data processing apparatus at least including a control unit, a storage unit, an output unit and a receive unit,
   wherein the control unit of the game device
      causes a game to progress by executing a game program stored in the storage unit of the game device or a game program stored in a recording medium loaded to the game device, and
      controls the send unit to send a signal to the data processing apparatus when a predetermined condition is satisfied in accordance with a progression status of the game, and
   wherein in the data processing apparatus, when the receive unit receives the signal, the control unit performs a predetermined process based on the signal.

2. The game system according to claim 1,
   wherein the predetermined condition is satisfied when a disadvantageous or advantageous status for a player happens or seems to happen in the progression status of the game, and
   wherein the predetermined process is to provide information regarding the disadvantageous or advantageous status for the player in the progression of the game.

3. The game system according to claim 2, wherein the data processing apparatus provides the information regarding the disadvantageous status or the advantageous status for the player in the progression of the game when the player performs specific input to the input unit of the game device, or to an input unit of the data processing apparatus when the data processing apparatus includes the input unit.

4. The game system according to claim 2, wherein the disadvantageous or advantageous status for the player or its information is based on data that is previously stored in the storage unit of the game device, or downloaded from a server via a network.

5. The game system according to claim 2, wherein the disadvantageous or advantageous status for the player or its information is based on e-book data capable of being downloaded from a server via a network by an operation of the player.

6. The game system according to claim 1,
   wherein the data processing apparatus stores nature data set to include nature of a specific character in the game, and
   wherein the predetermined process is a process to provide data based on the nature data.

7. The game system according to claim 6, wherein the nature data is previously stored in the storage unit of the game device, or downloaded from a server via a network.

8. The game system according to claim 6, wherein the nature data is changed based on game play content or a game play result by the player.

9. The game system according to claim 6, wherein the predetermined process is changed based on game play content or a game play result by the player.

10. The game system according to claim 1, wherein the control unit of the data processing apparatus performs the predetermined process when the predetermined condition is satisfied.

11. The game system according to claim 10,
    wherein the game device or the display device includes a speaker unit,
    wherein the data processing apparatus includes a sound receive unit, and
    wherein when the sound receive unit of the data processing apparatus receives sound output from the speaker unit, the control unit of the data processing apparatus performs predetermined output from the output unit of the data processing apparatus.

12. The game system according to claim 10,
    wherein the data processing apparatus includes an input unit that accepts voice input, a touch operation or an operation of pressing a button by the player, and
    wherein the control unit of the data processing apparatus performs predetermined output from the output unit of the data processing apparatus.

13. The game system according to claim 1,
    wherein the game device includes a receive unit,
    wherein the data processing apparatus includes a send unit,
    wherein in the data processing apparatus, when a predetermined condition of the data processing apparatus is satisfied, the send unit sends a signal to the game device, and
    wherein upon receiving the signal from the data processing apparatus, the control unit of the game device controls progression of the game based on the signal.

14. The game system according to claim 13,
    wherein the data processing apparatus stores nature data set to include nature of a specific character in the game, and
    wherein the predetermined condition of the data processing apparatus is a condition associated with the nature data.

15. The game system according to claim 13,
    wherein the control unit of the data processing apparatus sends a specific signal from the send unit of the data processing apparatus based on input by the player to the input unit of the data processing apparatus, and
    wherein the control unit of the game device controls the progression of the game based on the specific signal received by the receive unit of the game device.

16. The game system according to claim 15,
wherein when a player character directly operated by the player, and a computer character operated by the control unit of the game device exist in the progression of the game,
wherein the send unit of the data processing apparatus sends a specific signal based on input by the player to the input unit of the data processing apparatus, and
wherein the control unit of the game device controls behavior of the computer character based on the specific signal received by the receive unit of the game device.

17. The game system according to claim 1,
wherein the game device includes a camera unit,
wherein the camera unit detects behavior or facial expression of the player, or position of the data processing apparatus placed around the player, and
wherein the control unit of the game device controls the progression of the game based on the detected result.

18. The game system according to claim 1, further comprising an additional device at least including a send unit,
wherein when the additional device is added to the data processing apparatus, the receive unit of the data processing apparatus receives data sent from the send unit of the additional device, and
wherein upon receiving the data, the control unit of the data processing apparatus performs control different from a case when the data processing apparatus exists alone.

19. The game system according to claim 18,
wherein the additional device further includes a receive unit and an output unit,
wherein the data processing apparatus includes a send unit,
wherein when the additional device is added to the data processing apparatus, the receive unit of the additional device receives data sent from the send unit of the data processing apparatus, and
wherein the control unit of the data processing apparatus sends the data by including additional output data regarding output of the additional device.

20. The game system according to claim 1,
wherein the output unit of the data processing apparatus is one of or a combination selected from a group consisting of a light emission unit, a speaker unit, a portion that generates aroma, a portion that generates heat or coldness, a drive unit that is driven by a signal received from the game device, and an expansion unit capable of being inflated or deflated by controlling air pressure.

21. The game system according to claim 1, wherein the data processing apparatus is a clock, an accessary, clothes, a clothing ornament, a mirror, a stationery, a tableware, a furniture, an electric home appliance, a product for computers, a book, a ramp, a container; a figure, a doll, a stuffed toy, a cushion or a pillow having an appearance of a character, that appears in the game or relates to a game content, or to which the appearance is attached; or a model, a toy or a key chain having an appearance of a weapon, a guard or a tool worn or used by the character or to which the appearance is attached.

22. The game system according to claim 1,
wherein when a plurality of the data processing apparatuses exist, the player is configured to select the data processing apparatus to perform output by an operation via the game device when activating the game program.

23. A game device included in a game system,
the game system further including
a display device, integrally formed with the game device or separately formed from the game device, at least including an input unit connected to the game device and a display unit, and
a data processing apparatus at least including a control unit, a storage unit, an output unit and a receive unit,
the game device at least comprising:
a control unit;
a storage unit;
an output unit;
an input unit; and
a send unit,
wherein the control unit of the game device
causes a game to progress by executing a game program stored in the storage unit of the game device or a game program stored in a recording medium loaded to the game device,
controls the send unit to send a signal to the data processing apparatus when a predetermined condition is satisfied in accordance with a progression status of the game, and
controls the data processing apparatus to receive the signal by the receive unit and perform a predetermined process based on the signal by the control unit.

24. A data processing apparatus included in a game system,
the game system further including
a game device at least including a control unit, a storage unit, an output unit, an input unit and a send unit, and
a display device, integrally formed with the game device or separately formed from the game device, at least including an input unit connected to the game device and a display unit,
the data processing apparatus at least comprising:
a control unit;
a storage unit;
an output unit; and
a receive unit,
wherein when the control unit of the game device causes a game to progress by executing a game program stored in the storage unit of the game device or a game program stored in a recording medium loaded to the game device, and the send unit of the game device sends a signal to the data processing apparatus when a predetermined condition is satisfied in accordance with a progression status of the game, the receive unit of the data processing apparatus receives the signal, and the control unit of the data processing apparatus performs a predetermined process based on the signal.

25. A non-transitory computer-readable recording medium having recorded thereon a program for a game device, included in a game system that further includes a data processing apparatus, to execute a method comprising:
causing a game to progress by executing a game program stored in a storage unit of the game device or a game program stored in a recording medium loaded to the game device;
controlling to send a signal to the data processing apparatus when a predetermined condition is satisfied in accordance with a progression status of the game; and
controlling the data processing apparatus to receive the signal and perform a predetermined process based on the signal.

26. A non-transitory computer-readable recording medium having recorded thereon a program for a data processing apparatus, included in a game system that further includes a game device, to execute a method comprising:
when the game device causes a game to progress by executing a game program stored in a storage unit of the game device or a game program stored in a recording medium loaded to the game device, and sends a signal to the data processing apparatus when a predetermined condition is satisfied in accordance with a progression status of the game,
receiving the signal; and
performing a predetermined process based on the signal.

* * * * *